Aug. 11, 1959 W. J. HEACOCK 2,899,062
DRIVE FOR WATER INTAKE SCREENS
Filed May 9, 1957 9 Sheets-Sheet 2

United States Patent Office 2,899,062
Patented Aug. 11, 1959

2,899,062

DRIVE FOR WATER INTAKE SCREENS

Ward J. Heacock, Chicago, Ill., assignor to Link-Belt Company, a corporation of Illinois Application May 9, 1957, Serial No. 658,099

11 Claims. (Cl. 210—97)

This invention relates to new and useful improvements in traveling water screens and deals more particularly with drives for operating such screens.

It is the primary object of this invention to provide traveling water screens that are so driven as to permit remote control of the speeds of operation of the screens.

A further important object of the invention is to provide traveling water screens that are automatically controlled for intermittent operation at variable speeds in accordance with the rate of accumulation of trash on the screens.

Still another important object of the invention is to provide drives for operating traveling water screens in one direction at either of two selected speeds in accordance with the rates of accumulation of trash on the screens and in response to reversals in the direction of rotation of the drive motors.

Another object of the invention is to provide remotely controlled drives for operating traveling water screens at speeds that are automatically variable in accordance with the rate of accumulation of trash on the screen.

Other objects and advantages of the invention will be apparent during the course of the following description.

Figure 1:
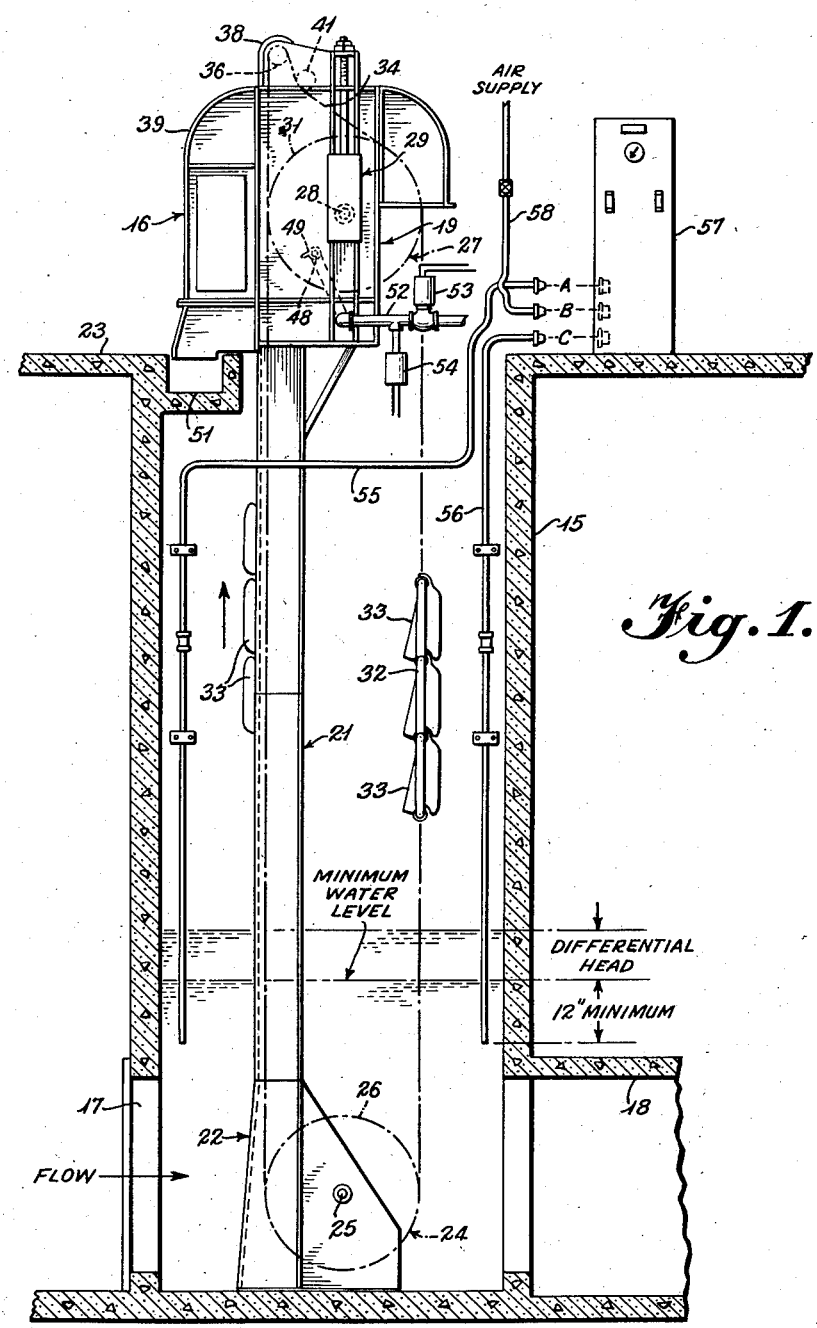
Figure 2:
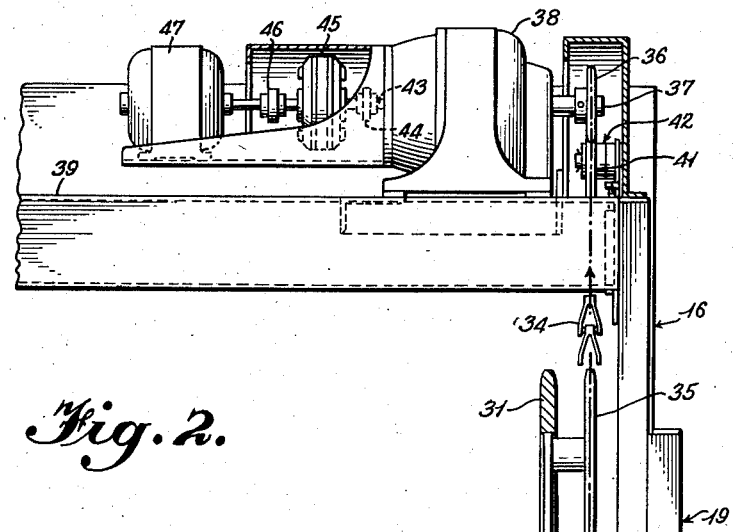
Figure 3:
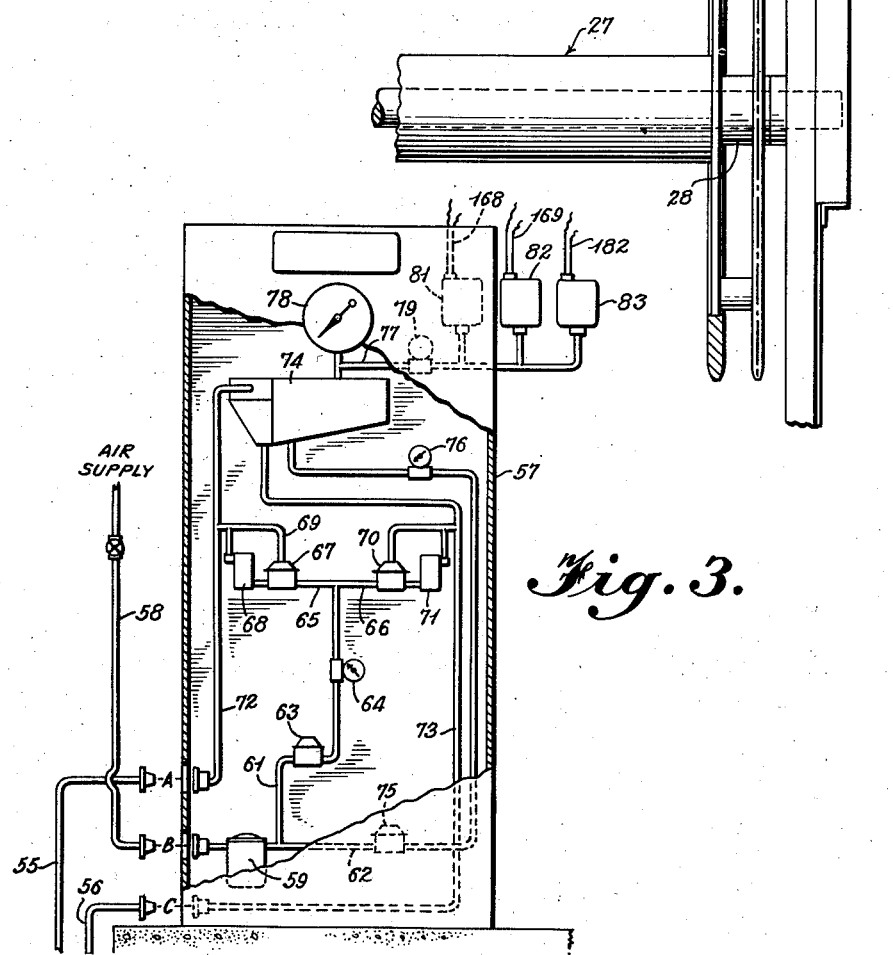
Figure 4:
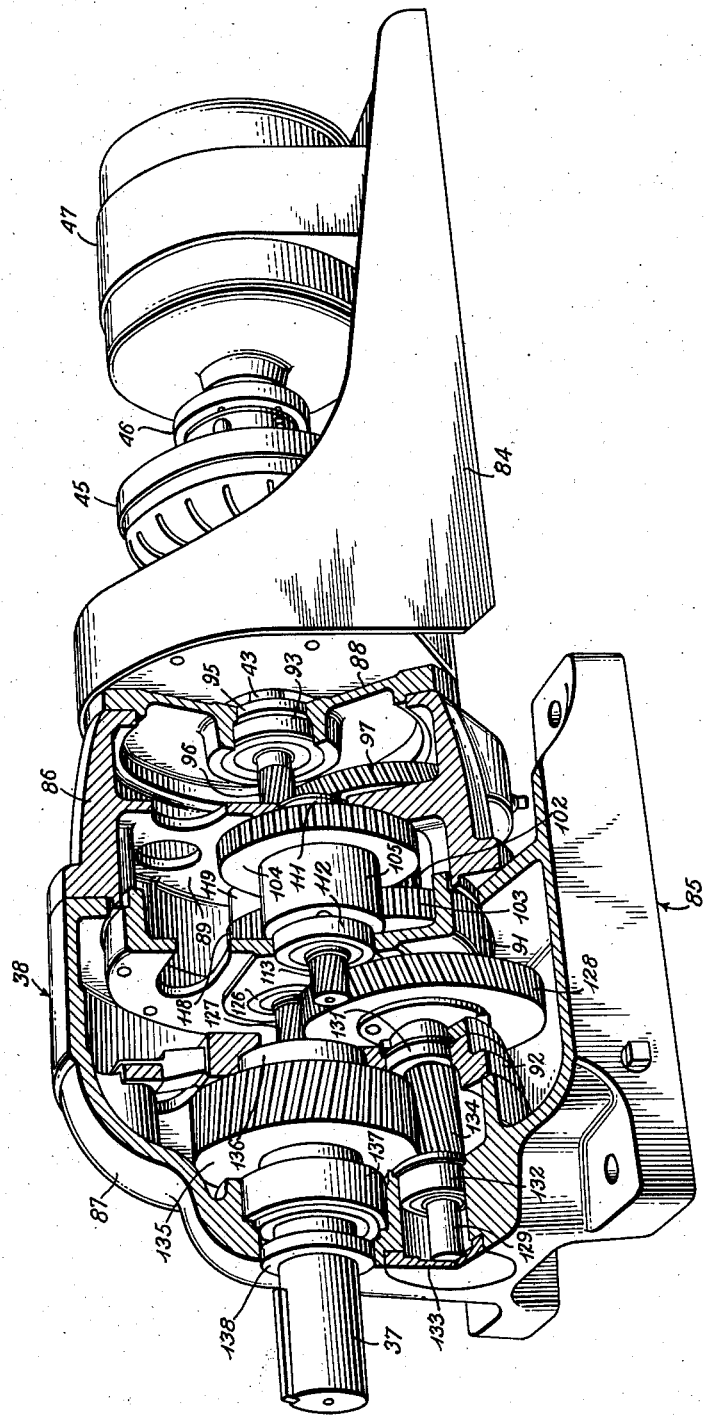
Figure 5:
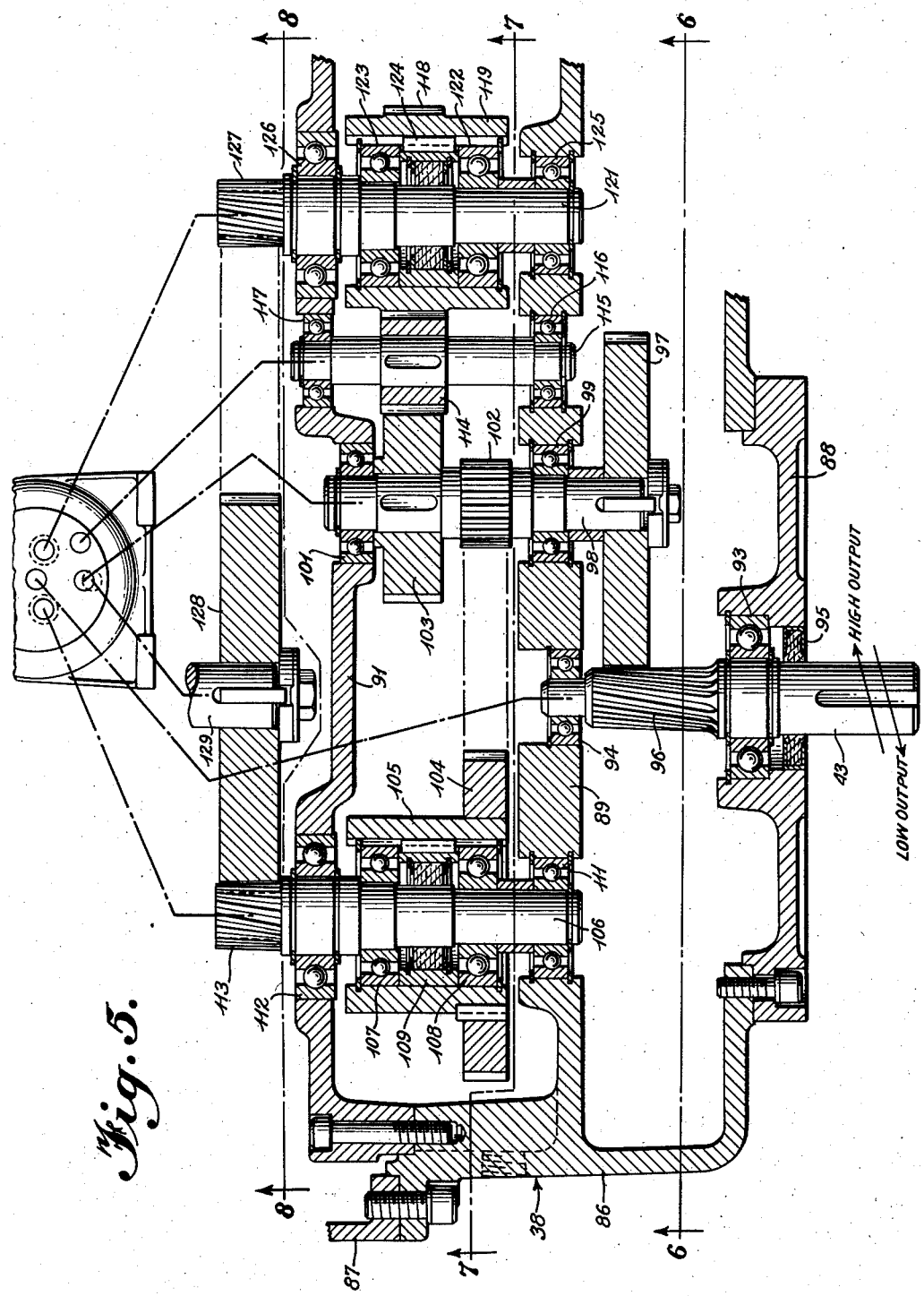
Figure 6:
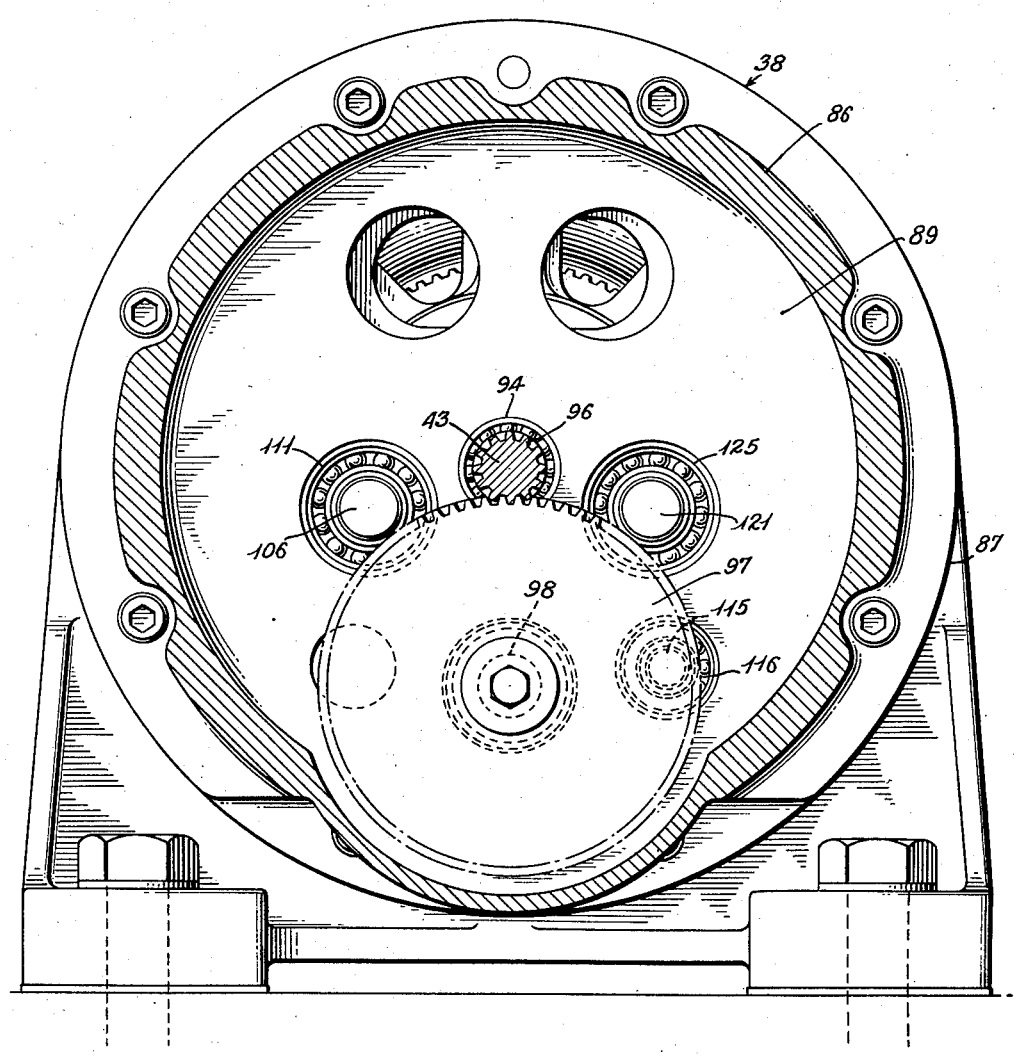
Figure 7:
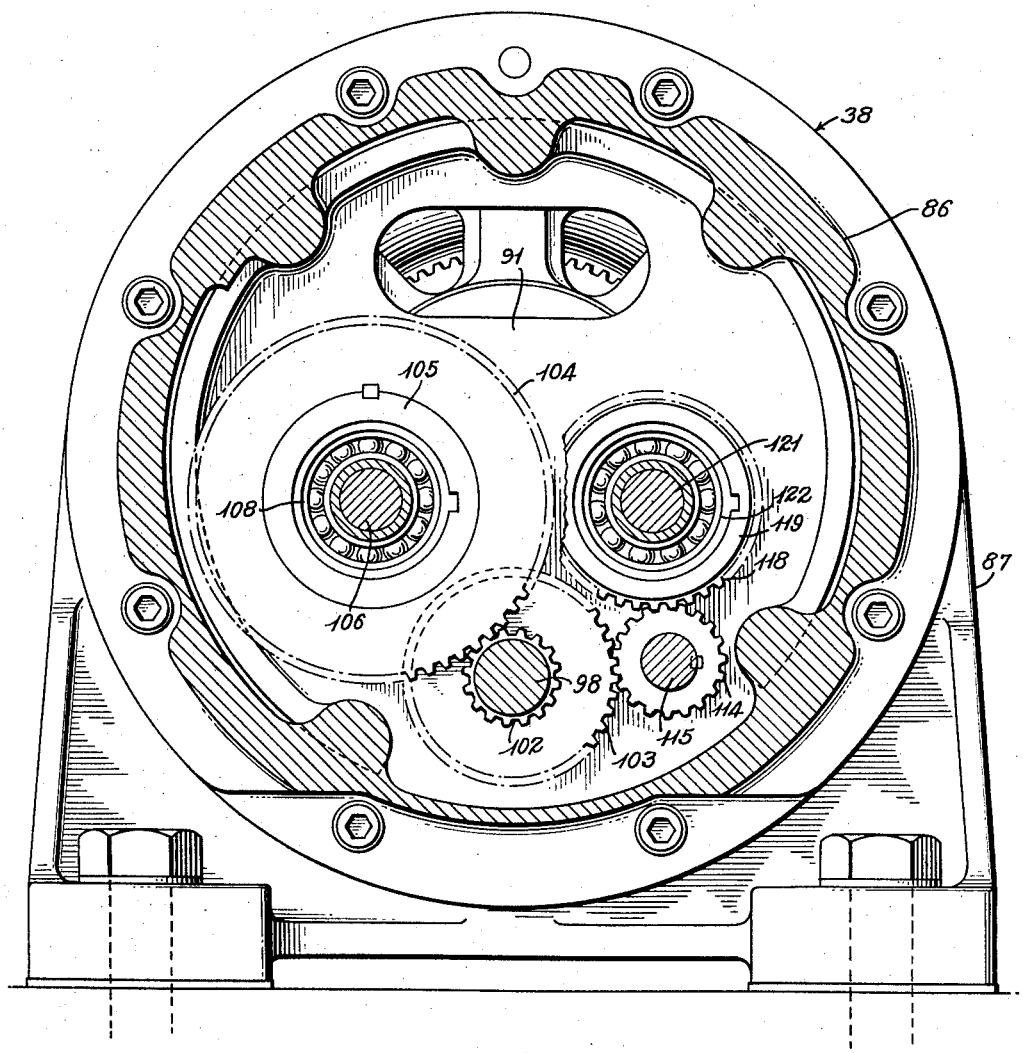
Figure 8:
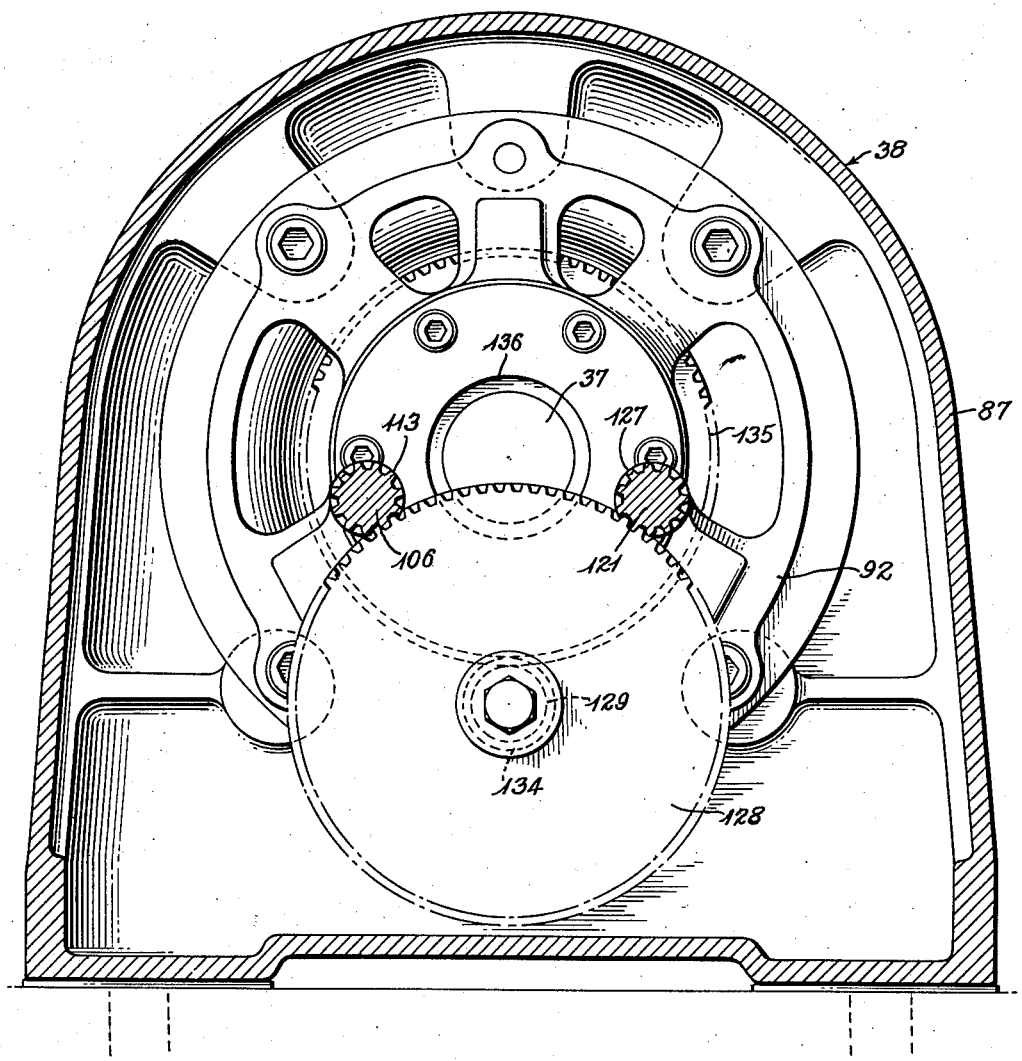
Figure 9:
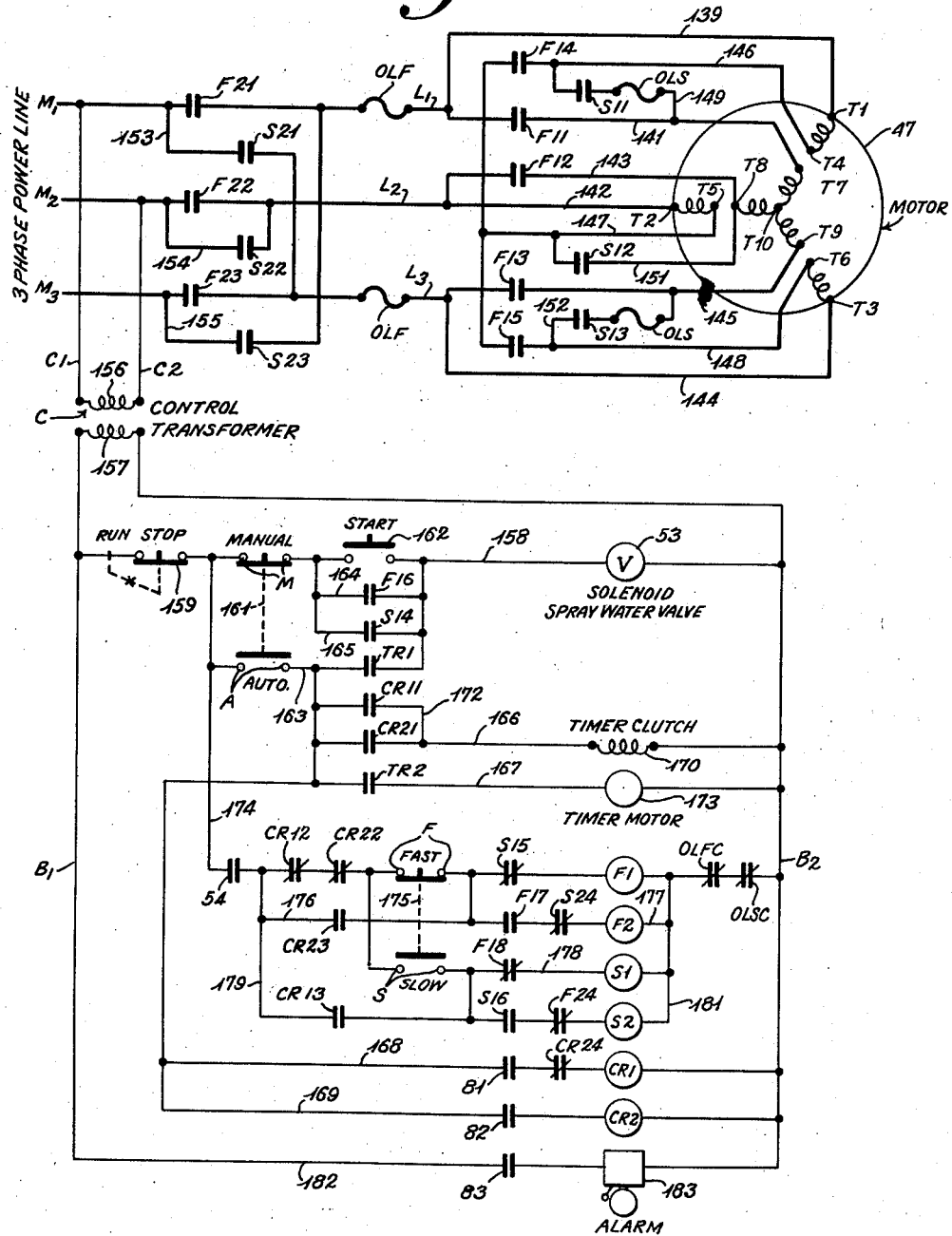
Figure 10:
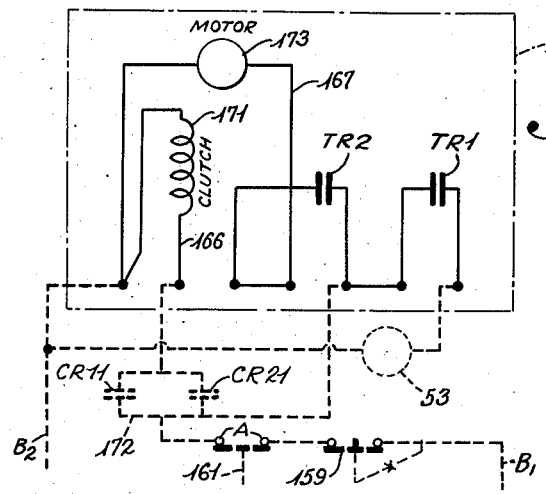
Figure 11:
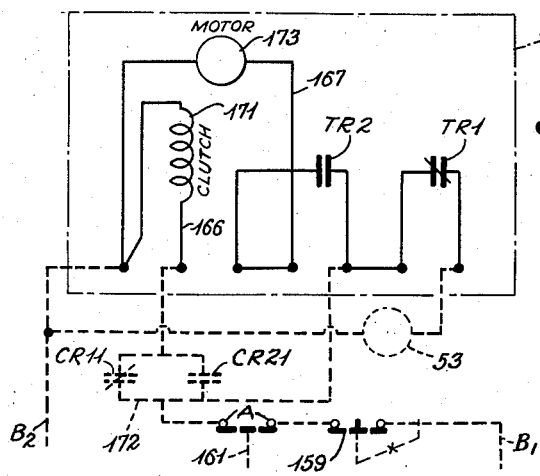
Figure 12:
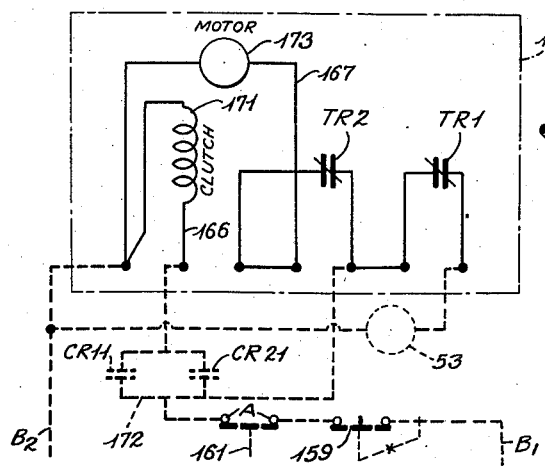

In the accompanying drawings forming a part of this specification and in which like reference characters are employed to designate like parts throughout the same, Figure 1 is a side elevational view of a water screen embodying the invention, Figure 2 is a fragmentary side elevational view, partly in cross section, of the drive for the screen of Fig. 1, Figure 3 is a front elevational view, partly broken away, of a pneumatic system for controlling operation of the drive of Fig. 2, Figure 4 is a perspective view, partly in section, of the gear reducer unit and motor employed in the drive of Fig. 2, Figure 5 is a schematic view of that portion of the gear reducer unit of Fig. 4 which provides alternate power transmitting paths with the gear shafts projected in a common plane to better illustrate the alternate paths, Figure 6 is a transverse sectional view of the gear reducer unit taken on line 6—6 of Fig. 5, Figure 7 is a transverse sectional view of the gear reducer unit taken on line 7—7 of Fig. 5, Figure 8 is a transverse sectional view of the gear reducer unit taken on line 8—8 of Fig. 5, Figure 9 is a schematic wiring diagram of the electrical circuit for controlling operation of the drive for the screen, and Figures 10 to 12, inclusive, are schematic diagrams of the timing device employed in the circuit of Fig. 9.

In the drawings, wherein for the purpose of illustration is shown the preferred embodiment of the invention, and first particularly referring to Fig. 1, there is shown a screen well 15 for receiving the traveling water screen designated in its entirety by the reference character 16. At the bottom of the well 15 there is provided an inlet 17 through which water flows into the front of the well and an outlet flume 18 through which water flows from the rear of the well. The depth of the water in the well 15 will depend, of course, on the head of the water entering through the inlet 17 and will vary between a minimum value below which no water will be permitted to enter the well and a maximum value which corresponds to the maximum depth of the water in the source from which the well is supplied. The screen 16 includes a head section 19, an intermediate frame 21 and a boot section 22. The head section 19 rests upon and is secured to the floor 23 adjacent the sides of the well 15 and the intermediate frame 21 is secured to and depends from the head section along opposite sides of the well. The boot section 22 is supported by the intermediate frame 21 and extends downwardly into closely spaced relationship with the bottom of the well 15. A foot sprocket assembly 24 is mounted in the boot section 22 and includes a shaft 25 having a pair of sprockets 26 mounted thereon adjacent opposite sides of the well 15.

Mounted in the head section 19 is a head sprocket assembly 27 which includes a shaft 28 that has its opposite end portions rotatably supported by take-up mechanisms 29 at opposite sides of the head section so that the head sprocket assembly can be adjusted to vary the center-to-center distance between the head sprocket assembly and the foot sprocket assembly 24. Mounted on opposite end portions of the shaft 28 adjacent the opposite sides of the head section 19 are the two sprockets 31 which are vertically aligned with the sprockets 26 of the foot sprocket assembly 24.

Trained around the two pairs of vertically aligned sprockets 26 and 31 are two endless chains 32 which are supported for movement on their associated sprockets along the opposite side walls of the well 15 and between which are connected a plurality of screen trays 33. The chains 32 and trays 33, therefore, form an endless screen structure that is movable in an upward direction from the foot sprocket assembly 24 to the head sprocket assembly 27 along the front of the well 15 into which the inlet 17 opens.

Movement is imparted to the chains 32 and their associated trays 33 by a drive chain 34, as best illustrated in Fig. 2. The drive chain 34 is trained around a driven sprocket 35 mounted on the shaft 28 adjacent one of the sprockets 31 and around a drive sprocket 36 that is mounted on the output shaft 37 of a speed reducer 38 that is mounted on the top of the splash housing 39 which substantially encloses the head section 19. Proper tension is maintained in the drive chain 34 by the idler sprocket 41 of a chain tightener mechanism 42. The input shaft 43 of the speed reducer unit 38 is connected through a flexible coupling 44, fluid coupling 45 and flexible coupling 46 to a drive motor 47.

Mounted between the sprockets 31 of the head sprocket assembly 27 in parallel relationship with the back of the upwardly moving run of the chains 32 and trays 33 is a spray pipe 48 having a plurality of nozzles 49 mounted thereon for spraying water from the pipe onto the inner faces of the trays as they are moved past the spray pipe. This spraying of water onto and through the trays 33 will remove any refuse that has accumulated thereon and will cause the refuse to be deflected from the path of movement of the trays into a trash trough 51 from which the refuse may be removed in any suitable manner. Water is supplied to the spray pipe 48 through a feed pipe 52 which is provided with a solenoid operated valve 53 and communicates, on the downstream side of the valve 53, with a pressure operated switch 54. Opening and closing of the valve 53, therefore, will permit water to flow through the feed pipe 52 to the spray pipe 48 and will cause the pressure operated switch 54 to close when water is permitted to flow through the feed pipe 52.

As illustrated in Fig. 1, a tube 55 is mounted on the side of the well 15 with its lower end terminating on the upstream side of the screen 16 and a second tube 56 extends into the lower portion of the well with its lower end positioned on the down-stream side of the screen. It will be noted that the two tubes 55 and 56 have their bottom ends arranged at the same level and at least twelve inches below the minimum surface level of the water in the well 15. The upper end of the tube 55 terminates at a coupling A in the lower portion of the control panel 57 and the upper end of the tube 56 terminates at a coupling C. Compressed air is supplied to the control panel 57 through a tube 58 leading to the coupling B of the panel.

Referring now to Fig. 3 for a detail description of the elements housed within the control panel 57, it will be seen that the air supply tube 58 is connected through the coupling B to a filter 59. From the filter 59 the flow of air is divided, one portion of the air flowing into a branch pipe 61 and the remainder of the air flowing into branch pipe 62. That portion of the air flowing through the branch pipe 61 passes through a pressure regulator 63 which maintains the pressure of the air on the downstream side thereof at a constant value. This constant pressure is indicated by the gauge 64 mounted in communication with the branch pipe 61.

The air flowing through the branch pipe 61 is again divided for flow into branch lines 65 and 66. The air flowing through the branch line 65 passes through a constant differential pressure relay 67 and a flow indicating and throttling device 68 which cooperate to maintain the rate of flow of air through the line at a constant value despite fluctuations in the pressure at the discharge end of the line. This is accomplished by varying the flow of air through the differential relay 67 in accordance with the varying back pressures in the pipe 69 from the downstream side of the throttling device 68. In other words, when the pressure at the discharge side of the throttling device 68 is increased, the flow of air through the relay 67 is increased and when the pressure at the discharge side of the throttling device 68, is decreased the flow of air through the relay is decreased so that the rate of flow from the discharge end of the line 65 is maintained constant.

The branch line 66 is similarly provided with a constant differential pressure relay 70 and a throttling and indicating device 71 for maintaining the rate of flow of air from the discharge end of the line 66 at a constant value.

The line 65 is connected by a branch line 72 to the coupling A which is in turn connected to the upstream tube 55 and the line 66 is connected by a branch line 73 to the coupling C which is in turn connected to the downstream tube 56. The two branch lines 72 and 73 are also connected to a differential convertor unit 74 which receives a supply of compressed air through the branch line 62. The pressure of the air flowing through the branch line 62 is maintained at a constant value by the pressure regulator 75 and this pressure is indicated by a gauge 76.

The differential converter unit 74 measures any differences which occur in the pressures of the air in the two branch lines 72 and 73 and their associated upstream and downstream tubes 55 and 56, respectively, and responds to any differential pressure that is so measured by varying the pressure of the air that is supplied to an outlet manifold 77 from the branch line 62. Connected to the manifold 77 is a gauge 78 which indicates in inches of water the differential pressure between the two branch lines 72 and 73. A second gauge 79 is connected to the manifold 77 for indicating the actual pressure in pounds per square inch of the air supplied to the manifold.

Three pressure operated electrical switches 81, 82 and 83 are connected to the manifold and are adjusted for successive operations at increasing pressures. In other words, the switch 81 will be closed by a manifold pressure of a given value, the switch 82 will be closed by a manifold pressure of a second, higher value and the switch 83 will be closed by a manifold pressure of a third and still higher value.

Referring now to Fig. 4, it will be noted that the drive motor 47 is mounted on a frame 84 which is supported on the input end of the gear reducer unit 38. A detail description of the operation of the motor 47 will be given at a later point, but it will be noted at this time that the motor is of a multiphase type that is wound for operation at either of two voltages, one voltage being equal to twice the other and which is reversible by a change in the phase relationship of the motor windings. It will be readily apparent that alternate operation of the motor 47 in opposite directions will alternately rotate the input shaft 43 of the gear reducer unit 38 in opposite directions. It will also be apparent that provision of a motor 47 adapted for operation at either of two voltages, one of which is equal to twice the other, will permit operation of the motor at a constant voltage but with a torque output that may be selectively varied between two values having a relationship of one-to-four. In other words, since the motor torque varies as the square of the voltage, operation of the motor at a constant voltage applied selectively to either of the dual voltage windings will selectively vary the torque output of the motor between two values bearing a relationship of one-to-four.

As illustrated in Fig. 4, the gear reducer unit 38 has its housing 85 formed with an input end section 86 and an output end section 87. The two housing sections 86 and 87 are rigidly connected to each other and an adapter plate 88 extends across and is rigidly connected to the outer end of the section 86 to close this end of the housing. The input end section 86 is also provided with a centrally located, transversely extending partition 89 and the inner of the section has mounted thereon a bearing retainer 91 which extends across and partially closes the inner end of the section 86. The output end section 87 is also provided with a transversely extending, centrally located bearing retaining plate 92.

As is best illustrated in Figs. 5 and 6, the input shaft 43 is rotatably supported by bearings 93 and 94 which are mounted in aligned openings in the closure plate 88 and the partition 89 in the input end section 86, respectively. A seal 95 is provided between the shaft 43 and the closure plate 88 outwardly of the bearing 93. The portion of the shaft 43 between the closure plate 88 and the partition 89 has teeth formed thereon to provide a pinion 96 which meshes with a gear 97 that is keyed to the outer end of a countershaft 98. The shaft 98 is supported for rotation by bearings 99 and 101 which are mounted in aligned openings in the partition 89 and the bearing retaining member 91, respectively. The portion of the shaft 98 between the partition 89 and the bearing retaining member 91 has teeth formed thereon to provide a pinion 102. A gear 103 is keyed to the shaft 98.

Referring now to Figs. 5 and 7, it will be seen that the pinion 102 meshes with a gear 104 that is keyed to a sleeve-type hub 105. The hub is rotatably supported on a shaft 106 by bearings 107 and 108 which are spaced axially along the shaft and between which is positioned a conventional type of one-way clutch unit 109 that is arranged to prevent relative rotation between the hub and shaft when the hub is rotated in a counter-clockwise direction as viewed from the input shaft end of the gear reducer unit 38. The shaft 106 is supported by bearings 111 and 112 that are mounted in aligned openings in the partition 89 and bearing retaining member 91, respectively, and that end portion of the shaft which extends through the bearing retaining member has formed thereon teeth which provide a pinion 113.

The gear 103 meshes with a pinion 114 that is keyed to a countershaft 115 rotatably supported by bearings 116 and 117 mounted in aligned openings in the partition 89 and bearing retaining member 91, respectively. The pinion 114 in turn meshes with the gear 118 that is formed on the outer surface of a sleeve 119. The sleeve 119 is rotatably mounted on a shaft 121 by bearings 122 and 123 which are spaced longitudinally of the shaft and between which is positioned a one-way clutch unit 124 that is arranged to prevent relative rotation between the sleeve 119 and the shaft 121 when the sleeve is rotated in a counterclockwise direction as viewed from the input shaft end of the gear reducer unit 38. The shaft 121 is supported by bearings 125 and 126 mounted in aligned openings in the partition 89 and bearing retaining member 91, respectively, and the end portion of the shaft which projects through the bearing supporting member has formed therein teeth to provide a pinion 127 that is identical with the pinion 113 of the shaft 106.

As is best illustrated in Figs. 4, 5 and 8, both of the two identical pinions 113 and 127 engage the gear 128 that is keyed to a shaft 129. As illustrated in Fig. 4, the shaft 129 is rotatably supported by bearings 131 and 132 mounted in aligned openings in the bearing retaining member 92 and the end wall of the output end section 87. A plug 133 is mounted outwardly of the shaft 129 and its supporting bearing 132 to close the section 87. Formed on that portion of the shaft 129 between the two bearings 131 and 132 is a pinion 134 which meshes with a gear 135 that is keyed to the output shaft 37 between the bearings 136 and 137 which support the output shaft for rotation on the bearing retaining member 92 and the end of the output end section 87. A seal 138 closes the space between the output shaft 37 and the end wall of the section 87 to prevent leakage of lubricant from the reducer unit 38.

Referring now to Figs. 4 and 5 for a detail description of the operation of the gear reducer unit 38, and first particularly referring to Fig. 5, it will first be noted that the following description of the directions of the various gears and pinions employed in the gear reducing unit have reference to the directions of rotation when viewed from the input end of the reducer unit.

When the input shaft 43 is rotated in a clockwise direction, the clockwise rotation of the pinion 96 will cause a counterclockwise rotation of the meshing gear 97 and the pinion and gear 102 and 103, respectively, which are carried by the same shaft 98. This counterclockwise rotation of the gear 103 will cause a clockwise rotation of the meshed pinion 114 and the clockwise rotation of the pinion 114 will in turn cause a counterclockwise rotation of the gear 118 and its associated sleeve 119. Since the one-way clutch unit 124 drives in a counterclockwise direction, the counterclockwise rotation of the sleeve 119 will cause a similar rotation of the shaft 121 and the pinion 127. Counterclockwise rotation of the pinion 127 will drive the meshed gear 128 in a clockwise direction and, as illustrated in Fig. 4, this clockwise rotation of the gear 128 will cause a similar rotation of the associated pinion 134 and a counterclockwise rotation of the gear 135 and the output shaft 37 upon which it is mounted.

While power is being transmitted through the gear reducer unit 38 in the manner described above, the counterclockwise rotation of the pinion 102 will cause a clockwise rotation of the meshed gear 104 but, since the one-way clutch unit 109 is arranged to drive in a counterclockwise direction only, this clockwise rotation of the gear 104 will only cause the sleeve 105 to rotate freely upon the shaft 106. It will also be noted that the clockwise rotation in the gear 128 by the pinion 127 will cause a counterclockwise rotation of the pinion 113 which is also meshed with the gear 128. This counterclockwise rotation of the pinion 113, however, will have no effect upon the sleeve 105 which is rotating in an opposite direction because of the arrangement of the one-way clutch unit 109 to drive only in a counterclockwise direction.

When the direction of rotation of the input shaft 43 is reversed, the pinion 96 will be rotated in a counterclockwise direction and the gear 97 along with the pinion and gear 102 and 103, respectively, will be rotated in a clockwise direction. Clockwise rotation of the pinion 102 will cause the meshed gear 104 to be rotated in a counterclockwise direction so that the sleeve 105 upon which this gear is mounted will also rotate in a counterclockwise direction and will drive the shaft 106 through the one-way clutch unit 109. Counterclockwise rotation of the shaft 106 will cause a similar rotation of the pinion 113 to rotate the gear 128 in a clockwise direction and will impart a similar rotation to the pinion 134 and a counterclockwise rotation to the gear 135 and the output shaft 37 upon which the latter gear is mounted.

While power is being transmitted through the gear reducer unit 38 in this manner, the rotation of the gear 103 in a clockwise direction will cause the pinion 114 to be driven in a counterclockwise direction and the gear 118 in a clockwise direction. This clockwise rotation of the gear 118 and its associated sleeve 119, however, will cause the sleeve to rotate freely on the shaft 121 due to the arrangement of the one-way clutch unit 124 to drive only in a counterclockwise direction. Similarly, the rotation of the gear 128 by the pinion 113 will cause a rotation of the pinion 127 in a counterclockwise direction, in which direction the shaft 121 is free to rotate relative to the sleeve 119.

From the above description of the operation of the gear reducer unit 38, it will be seen that power is transmitted through either the pinion 102 or the gear 103 to rotate the gear 128 and that the particular gear through which power is transmitted to the gear 128 will depend upon the direction of rotation of the input shaft 43. Further, since the gear 103 transmits power to the gear 128 through one more element, that is the pinion 114, than is employed in the gear train through which the pinion 102 drives, the direction of rotation of the gear 128 will be the same despite reversals in the direction of rotation of the input shaft 43.

It will also be noted that the diameter of the pinion 102 is substantially smaller than that of the gear 104 driven thereby so that there will be a substantial reduction in the speed of rotation in the shaft 106 relative to the speed of rotation of the shaft 98 when the gear 128 is being driven by the pinion 102. On the other hand, since the diameter of the gear 103 is only slightly less than that of the gear 118 and the idler pinion 114 merely transmits rotation from one to the other of these two gears without a substantial change in the speed of rotation of the gear 118 relative to the gear 103, the shaft 121 will be rotated at a speed which is nearly equal to that of the speed of rotation of the shaft 98 when the gear 128 is being driven by the gear 103.

By proper design of the various pairs of meshing pinions and gears employed in the gear reducer unit 38, the speed of rotation of the gear 128 when driven alternatively through the gear trains that are operated by the pinion and gear 102 and 103, respectively, can be established at a ratio of four-to-one. In other words, rotation of the input shaft 43 in a clockwise direction will cause the gear 128 to rotate in a clockwise direction and at a speed equal to four times its speed of rotation in the same direction when the input shaft 43 is rotated in a counterclockwise direction. The lower speed of rotation of the gear 128, provided by the counterclockwise rotation of the input shaft 43, is accompanied by an approximate increase in the ratio of torque output relative to torque input for the gear reducer unit 38 to a value of four to one. In order to maintain the output torque at the shaft 37 at a substantially constant value, therefore, the output torque delivered by the motor 47 to the input shaft 43 is reduced when the motor is rotated in a counterclockwise direction and increased when the motor is operated in a clockwise direction by selectively switching the connections of the motor windings between the two arrangements provided for dual voltage operation of the motor while maintaining the voltage applied to the motor at a constant value.

Referring now to Fig. 9 for a detail description of the electric circuits for controlling operation of the motor 47, it will be seen that the motor has its windings connected in a star or Y arrangement and that each of the windings is divided into two equal parts. One part of one of the windings is connected to terminals T1 and T4, while the corresponding part of a second winding is connected to terminals T2 and T5 and the corresponding part of a third winding is connected to terminals T3 and T6. The other parts of the three windings are connected to terminals T7, T8 and T9, respectively, and to a common point T10 at the junction of the Y or star which is formed by the windings. Power is supplied to the terminals T1 to T9, inclusive, from lines L1, L2 and L3 of a three-phase power supply system as follows:

Line L1 is connected to the terminals T1 and T7 of one of the windings through branch lines 139 and 141, respectively. Line L2 is connected to terminals T2 and T8 of the second windings by branch lines 142 and 143, respectively, and line L3 is connected to the terminals T3 and T9 of the third winding by branch lines 144 and 145, respectively. The three branch lines 141, 143 and 145 are provided with contactors F11, F12 and F13 for controlling the flow of current therethrough as will be later described. The three terminals T4, T5 and T6 of the three windings are connected to each other by branch lines 146, 147 and 148, respectively, the branch lines 146 and 148 being provided with contactors F14 and F15 for controlling the flow of current therethrough. A direct connection is provided between the terminals T4 and T7 of the first winding by a line 149 which is connected between the branch lines 141 and 146 and which is provided with a contactor S11 and the heater element OLS for operating an overload relay. A similar connection is provided between the terminals T5 and T8 of the second winding by line 151 which extends between branch line 147 and terminal T8 and which is provided with a contactor S12. The terminals T6 and T9 of the third winding are also connected by a line 152 which extends between branch lines 145 and 148 through contactor S13 and a heater element OLS which is identical to the heater element OLS of the line 149. All of the contactors F11 to F15, inclusive, and S11 to S13, inclusive, are normally open and are closed by energization of the relay coils F1 and S1, respectively, in the control circuit.

The operation of these coils will be later described, but it will be noted at this time that, when the contactors F11 to F15 are closed one terminal of each of the two parts of each motor winding is connected directly to an associated one of the lines L1, L2 or L3 and the other end of each part of each winding is connected to the corresponding end of the corresponding part of each of the other two windings so that the two parts of each of the windings are connected in parallel relationship. When the contactors F11 to F15 are open, however, and the contactors S11 to S13 are closed, the two parts of each winding are connected in series between an associated one one of the lines L1, L2 or L3 and the common point T10 at the center or star or Y formed by the windings. In other words, alternate operation of the contactors F11 to F15 or S11 to S13 will cause the two parts of each winding to be connected in series or parallel relationship so that the voltage drop across each part of each winding is effectively doubled when the parts are connected in parallel relationship.

When the motor is operated at a constant voltage, however, the torque delivered by the motor will be varied at a ratio of four to one by alternate operation of the contactors F11 to F15 or S11 to S13. This four to one ratio in the torque delivered by the motor 47 results from the characteristic of the motor operation wherein the torque delivered by the motor is proportional to the square of the voltage drop across the motor windings. The two heater elements OLS employed in lines 149 and 152 will operate overload relays to stop operation of the motor when the contactors S11 to S13 are closed and the load on the motor is such as to cause an excessive current flow through the motor windings.

The three lines L1, L2 and L3 for supplying electrical energy to the motor 47 are connected to the three main lines M1, M2 and M3 of a three-phase power supply system through contactors F21, F22 and F23. Alternate connections are provided, however, by branch line 153 which extends between lines M1 and L3 through contactor S21 by line 154 which extends between lines M2 and L2 through contactor S22, and by line 155 which extends between lines M3 and L1 through contactor S23. When contactors F21, F22 and F23 are opened or closed, therefore, while the contactors S21, S22 and S23 are closed and opened, respectively, the phase relationship between lines L1, L2 and L3 and lines M1, M2 and M3 is reversed and the direction of operation of the motor 47 will be similarly reversed. Heater elements OLF are connected into lines L1 and L2 to operate overload relays and to prevent operation of the motor 47 when the load thereon is sufficiently great to cause an excessive amount of current to be drawn to the motor windings.

Two lines C1 and C2 lead from the main lines M1 and M2 to the primary winding 156 of a control transformer C. The secondary winding 157 of this transformer is connected to the two lines B1 and B2 which form the opposite sides of the circuit for controlling operation of the motor 47 as will be hereafter described. A branch line 158 is connected between the two lines B1 and B2 through a single pole, single throw maintained contact, push button switch 159, terminals M of a single pole, double throw, maintained contact type switch 161, a single pole, single throw, momentary contact type switch 162 and the solenoid V of the valve 53 for controlling the flow of water to the spray pipe 48.

The second two terminals A of the switch 161 are connected into a branch circuit 163, which includes contactor TR1 and is arranged in parallel relationship with the terminals M of the switch 161, and with the switch 162. A pair of branch circuits 164 and 165 are arranged in parallel relationship with the switch 162 through contactors F16 and S14, respectively. Four separate branch circuits 166, 167, 168 and 169 are arranged in parallel relationship with the circuit through the contactor TR1 and the solenoid V of the valve 53. The branch circuit 166 includes a contactor CR21 and the coil 170 for operating the clutch of a reset type electrical timer 171 as schematically illustrated in Figs. 10, 11 and 12. The timer 171 will be more fully described at a later time. A branch circuit 172 in arranged in parallel relationship with the contactor CR21 through a contactor CR11. The branch circuit 167 includes contactor TR2 and the motor 173 of the timer 171. Branch circuit 168 is connected through and controlled by the pressure operated switch 81, normally closed contactor CR24, and the operating coil of the relay CR1 which operates contactors CR11, CR12 and CR13. Branch circuit 169 is connected through and is controlled by the pressure operated switch 82 and through the operating coil of relay CR2 which controls the operation of contactors CR21 to CR24.

Connected in parallel relationship with switches 161 and 162 and the solenoid V of the valve 53 in the branch circuit 158 is a branch circuit 174 which is connected through the pressure operated switch 54, normally closed contactor CR12, normally closed contactor CR22, the terminals F of a single pole, double throw, maintained contact switch 175, normally closed contactor S15, the relay F1 which controls the operation of contactors F11 to F18, inclusive, and through the two normally closed overload contactors OLFC and OLSC. A branch circuit 176 is connected in parallel relationship with the contactors CR12 and CR22 and the terminals F of switch 175 through contactor CR23. A second branch circuit 177 is connected in parallel relationship with the contactor S15 and the coil of relay F1 through the contactor F17 and the normally closed contactor S24 and through the operating coil of relay F2 which operates the contactors F21 to F24, inclusive. A branch circuit 178 is connected in parallel relationship with the terminals F of the switch 175, the contactor S15 and the operating coil of relay F1 through the terminals S of the switch 175, the normally closed contactor F18 and the coil of relay S1 which operates the contactors S11 to S16, inclusive. A branch circuit 179 is connected in parallel relationship with the contactors CR12 and CR22, and the terminals S of switch 175 through contactor CR13. A branch circuit 181 is connected in parallel relationship with contactor F18 and the coil of relay S1 through the contactor S16 and the normally closed contactor F24 and through the coil of relay S2 which operates contactors S21 to S24, inclusive. A branch circuit 182 is connected directly between the two sides B1 and B2 of the control circuit through the pressure operated switch 83 and through an electrically operated alarm device 183.

The reset type timer 171, which employs the coil 170 for operating the timer clutch and is driven by a motor 173, provides for timed operation of the contactors TR1 and TR2 and is schematically illustrated, along with associated portions of the control circuit, in Figs. 10 to 12, inclusive. This timer 171 is a synchronous motor driven device which trips its contacts open after an adjustable time interval and which is electrically started and reset. The structure of the timer is fully illustrated and described in United States Patent No. 2,175,865, issued to Carl L. Anderson, on October 10, 1939, and is entitled "Timing Switch and Mechanism." Further detailed information concerning the operation of the timer is provided by Bulletin 110, published in September, 1956, by the Eagle Signal Corporation of Moline, Illinois, assignee of the above-mentioned patent, and by Bulletin 110C, published by the same company in June, 1956.

Referring now to Figs. 10 to 12, inclusive, for a detailed description of the manner in which the timer 171 cooperates with the associated portions of the control circuit, and first particularly referring to Fig. 10 which illustrates the timer in an inoperative or timed out condition, it will be noted that the coil 170 of the timer clutch is de-energized and that the motor 173 is not operating. Closing of either of the two contactors CR11 or CR21 will energize the clutch coil 170 to reset the timer 171 and to close the contactor TR1 as illustrated in Fig. 11. The timer 171 will thereafter remain in its reset condition until both of the contactors CR11 and CR21 are opened, at which time the clutch coil 170 is de-energized. This de-energization of the coil 170 will cause the contactor TR2 to be closed to start the timer motor 173 and to thereby initiate the timing cycle. During this timing cycle the contactor TR1 will remain closed as illustrated in Fig. 12 and at the end of the timing cycle the timer will return to its inoperative or timed out condition as illustrated in Fig. 10.

Referring once again to Fig. 9 for a detail description of the manner in which the control circuits either automatically or manually control the operation of the motor 47 which drives the screen 16, it will be noted first that certain of the contactors employed in the control circuit are normally closed. In other words, when the coils of the relays operating these contactors are de-energized, the contactors are closed and when the coils are energized the contactors are opened. The normally closed contactors OLFC and OLFS open in response to excessive heating of the heater elements OLF and OLS to cause the overload relays operated thereby to absolutely prevent energization of the coils of the relays F1, F2, S1 and S2 when an overload on the motor 47 has caused one or more of the overload relays to open the motor circuits.

Assuming first that the drive motor 47 is to be manually controlled, the "Run" button of the switch 159 is depressed to close this switch, while switch 161 is positioned to close the terminals M for manual operation, and switch 175 is positioned to close either the terminals F or the terminals S depending upon whether or not it is desired to operate the screen at its fast or slow speed, respectively. The motor 47 will thereafter be set in operation to drive the screen 16 by depressing the "Start" button of the switch 162 to close the branch circuit 158 and to thereby energize the coil V of the solenoid operated valve 53. This will open the valve 53 to effect spraying of cleaning water through the screen. Opening of the valve 53 will in turn cause the pressure operated switch 54 to close. Since no current can be supplied to the coils of relays CR1 or CR2 through the open terminals A of switch 161, current will thereupon flow through the normally closed contactors CR12 and CR22 and through the selected terminals F or S of the switch 175.

Assuming first that the terminals F have been selected to provide a fast operation of the screen 16, current will flow through these terminals and through the normally closed contactor S15 to energize the coil of relay F1 and to thereby close contactors F11 to F17, inclusive, and to open the normally closed contactor F18. Closing of the contactor F17 will permit current to flow through the normally closed contactor S24 in the branch circuit 177 to energize the coil of relay F2 and to thereby close the contactors F21 to F23, inclusive, and to open the normally closed contactor F24. Opening of the normally closed contactors F18 and F24 will absolutely prevent any possibility of energization of the coils of relays S1 and S2 and closing of the contactor F16 will close the branch circuit 164 so that subsequent release of the start switch 162 will not cause the coil V of the solenoid valve 53 to be de-energized. Closing of the contactors F11 to F15, inclusive, will connect the two parts of each motor winding in parallel relationship so that the torque delivered by the motor will be at its maximum value. Closing of the contactors F21 to F23, inclusive, will cause the phase relationship between the various motor windings to be such as to impart a clockwise rotation to the input shaft 43 of the speed reducer unit 38 so that the output shaft 37 of the unit will be driven at its maximum speed.

If the terminals S of the switch 175 were closed instead of the terminals F, closing of the pressure operated switch 54 would cause current to flow through the normally closed contactors CR12 and CR22, the terminals S, and the normally closed contactor F18 of the circuit 178 to energize the coil of the relay S1. This energization of the coil of the relay S1 would in turn close the contactors S11 to S14, inclusive, and S16 and would open the normally closed contactor S15. Closing the contactor S16 would in turn complete a circuit through the normally closed contactor F24 and the coil of the relay S2 in the branch circuit 181 so that the relay S2 would be energized and would close the contactors S21 to S23, inclusive, and would open the normally closed contactor S24. Opening of the contactors S15 and S24 would positively prevent any energization of the coils of relays F1 or F2 and closing of the contactor S14 would cause the branch circuit 165 to be closed in parallel relationship with the switch 162 so that subsequent release of the switch would not de-energize the solenoid operated valve 53. When the contactors S11 to S13 are closed, the two parts of each motor winding are connected in series so that the torque delivered by the motor will be equal to one-fourth its maximum value. Further, the closing of the contactors S21 to S23, inclusive, will reverse the phase relationship of the motor windings so that the motor will operate in a counterclockwise direction and the speed of rotation of the output shaft 37 of the gear reducer unit 38 will be reduced to one-fourth its maximum value.

Under either of the two above-described conditions of manual operation of the control for the motor 47, the motor will continue to operate as described until the stop button of the switch 159 is depressed to open the various control circuits. Operation of the two pressure operated switches 81 and 82 will have no effect on the manual operation of the control circuit because no electrical energy can be supplied to either of the relays CR1 or CR2 even if the switches are closed. Operation of the pressure operated switch 83, however, will cause the alarm device 183 to be energized showing an abnormally high pressure drop across the screen due to the accumulation of refuse thereon.

Assuming that the operation of the motor 47 for driving the screen 16 is to be automatically controlled, the "Run" button of the switch 159 is depressed and the switch 161 is positioned to close a circuit between the terminals A for automatic operation of the system. The setting of the switch 175 is immaterial to the automatic operation of the control system and the "Start" button of the switch 162 need not be depressed to initiate the automatic control.

Assuming first that the differential pressure across the screen 16 is such that no one of the switches 81, 82 or 83 is closed, all of the various control circuits will be open and the motor 47 will remain at rest. A subsequent increase in the pressure drop across the screen will cause the pressure operated switch 181 to be closed to thereby complete a circuit through the normally closed contactor CR24 and the coil of the relay CR1 in the branch circuit 168. Energization of the relay CR1 will in turn close contactors CR11 and CR13 and will open contactor CR12. Closing of the contactor CR11 will close the branch circuit 172 to energize the coil 170 of the timer clutch and to thereby reset the timing device 171. This resetting of the timing device will in turn close the contactor TR1 to energize the coil V of the solenoid operated valve 53 which is thereby opened to supply cleaning spray water to the screen 16. This opening of the valve 53 will also cause the pressure operated switch 54 to close so that current will flow through the closed contactor CR13, the normally closed contactor F18 and the coil of the relay S1 in the branch circuit 178 to energize the relay and to thereby close the contactors S11 to S14, inclusive, and S16 and to open contactor S15. The closing of the contactor S16 will in turn close a circuit through the normally closed contactor F24 and the coil of the relay S2 in the branch circuit 181 so that the contactors S21 to S23 are closed and the contactor S24 is opened. Energization of the coils of the two relays S1 and S2 will effect operation of the motor 47 with its lowest output torque and in a direction to cause the output shaft 37 of the speed reducer 38 to rotate at its slower speed in the same manner as was previously described in connection with the manual operation of the device.

If the rate of accumulation of trash on the screen 16 continues to increase, the pressure drop across the screen will also continue to increase and the pressure operated switch 82 will be operated to close the branch circuit 169 through the coil of the relay CR2. The contactors CR21 and CR23 will thereupon be closed and contactors CR22 and CR24 will be opened. Opening of the contactor CR24 will de-energize the coil of the relay CR1 so that th contactors CR11 and CR13 will open. Closing of the contactor CR21, however, will cause the coil 170 of the timer clutch to remain in an energized condition to maintain the contactor TR1 closed so that the open condition of the valve 53 will be maintained and the closed position of the switch 54 will also be maintained. Closing of the contactor CR23, therefore, will complete a circuit through the normally closed contactor S15 and the coil of relay F1 to energize this relay. Contactors F11 to F17, inclusive, will thereupon be closed and the contactor F18 will be opened. Closing of the contactor F17 will complete a circuit through the normally closed contactor S24 and the coil of the relay F2 in the branch circuit 177 so that the relay F2 will be energized and the contactors F21 to F23 will be closed and the contactor F24 will be opened. The motor 47 will thereupon be set in operation with its highest output torque and in a direction to cause the output shaft 37 of the speed reducer 38 to rotate at its highest speed in the same manner as was described in connection with the energization of the relays F1 and F2 when the motor is manually controlled.

The motor will continue to operate in a manner to drive the screen 16 at its maximum speed until the differential pressure across the screen is reduced to a sufficient extent to open the pressure operated switch 82. Contactor CR24 will thereupon close and the screen will continue to be operated at its lower speed for so long as the pressure operated switch 81 is closed. A continued reduction in the pressure drop across the screen 16, however, will cause the switch 81 to be opened whereupon the coil 170 of the timer clutch is de-energized due to the open position of both the contactors CR11 and CR21.

As described in connection with the timing apparatus 171, de-energization of the clutch coil 170 will cause the timing apparatus to begin its timing cycle by closing the contactor TR2 to close the branch circuit 167 to the timer motor 173. The contactor TR1 will remain closed during the timing cycle and the length of the cycle may be so adjusted as to provide one complete revolution of the screen 16 after the switch 81 is opened. The timing apparatus 184 thereupon reaches its timed out condition and both of the contactors TR1 and TR2 are opened so that the valve 53 will be closed and the pressure operated switch 54 opened. All of the control circuits to the relays F1, F2, S1 and S2 are thereby opened so that the motor 47 will be stopped and will remain stopped until the pressure drop across the screen 16 is again sufficient to close the switch 81.

The pressure operated switch 83 plays no part in the control of the operation of the motor 47 but closes a branch circuit 182 when the pressure drop across the screen 16 is excessive so that an alarm 183 is actuated and will call an operator's attention to the overloaded condition of the screen.

It is to be understood that the form of this invention herewith shown and described is to be taken as a preferred example of the same and that various changes in the shape, size, and arrangement of parts may be resorted to without departing from the spirit of the invention or the scope of the subjoined claims.

Having thus described the invention, I claim:

1. The combination with an endless series of interconnected screen trays supported for movement through a closed path including a screening portion wherein the trays extend across a stream of flowing water for removing trash from the stream, and spray means for removing trash from said trays at a location in said path above said stream, of a drive for moving said trays through said path, comprising a reversible drive motor, and a speed reducer having an input shaft drivingly connected to said motor for rotation thereby and an output shaft drivingly connected to said trays for moving the latter, said speed reducer having two gear trains between said input and output shafts with one of said trains having an even number of gears therein and the other of said trains having an odd number of gears therein, means selectively actuating said gear trains in accordance with the direction of rotation of said motor to drive the output shaft in one direction only and through the selected gear train and means for controlling the direction of the drive motor rotation in response to the difference in the levels of the water on opposite sides of the screen trays in said screening portion.

2. The combination defined in claim 1 further characterized by said two gear trains having different speed reduction ratios to rotate said output shaft at different low speeds while said input shaft is rotated at a constant high speed but alternately in opposite directions.

3. The combination defined in claim 2 further characterized by said drive motor being an electric motor and having windings connectable for operation on a selected one of a plurality of electrical voltages, and means for switching the connections of said windings in response to a change in the direction of motor rotation to cause the motor to deliver more power to the input shaft of the speed reducer when the direction of rotation of the motor is such as to actuate the gear train for driving the output shaft at the higher of its two speeds of operation.

4. The combination defined in claim 1 further characterized by said means for selectively actuating said gear trains comprising a pair of one-way clutches drivingly associated one with each of the two gear trains and arranged for alternate operation by rotation of said input shaft alternately in opposite directions.

5. In a water screen having an endless series of interconnected screen trays supported for movement through a closed path including a screening portion wherein the trays extend across a stream of flowing water for removing trash from the stream, and spray means for removing trash from said trays at a location in said path above said stream, the combination comprising a reversible drive motor, a speed reducer having an input shaft drivingly connected to said motor for rotation thereby and an output shaft drivingly connected to said trays for moving the latter, said speed reducer having two gear trains between said input and output shafts with one of said trains having an even number of gears therein giving a first speed reduction ratio and the other of said trains having an odd number of gears therein giving a second speed reduction ratio different from said first ratio, means selectively actuating said gear trains in accordance with the direction of rotation of said motor to drive the output shaft in one direction only and through the selected gear train, a valve for controlling the actuation of said spray means, means for operating said valve, means for conditioning said motor for rotation in a desired direction, and starter means for jointly energizing said motor and said valve operating means.

6. The combination defined in claim 5 further characterized by said motor being an electric motor having windings arranged for connection to a source of electrical energy alternately in different relationships with the source to cause the motor to rotate alternately in opposite directions, and means for automatically actuating said starter means in response to an increase to a first selected value in the difference in the levels of the water on opposite sides of the trays in said screening portion.

7. The combination defined in claim 6 further characterized by said means for conditioning said motor for rotation in a desired direction including means for alternating the connections of said motor windings to said source of electrical energy to reverse the direction of rotation of the motor in response to the difference in the levels of the water on opposite sides of the trays in said screening portion, said connection alternating means connecting said windings for rotation of the motor in a direction to rotate the output shaft of the speed reducer at its lower speed when said difference in the levels of the water has increased to said first selected value and for rotation of the motor in the opposite direction to increase the speed of rotation of said output shaft when the difference in water levels has increased to a second selected value above said first selected value.

8. The combination comprising a traveling screen positioned across a stream of fluid for the removal of trash therefrom, a reversible drive motor, a speed reducer having an input shaft drivingly connected to said drive motor and an output shaft drivingly connected to said screen for moving the latter, said speed reducer including a first gear train having an even number of gears for transmitting and reducing the speed of rotation from said input shaft to said output shaft, means associated with said first gear train for drivingly connecting two of the gears of said first train only when said input shaft is rotated in one direction to cause said output shaft to be rotated in a given direction, a second gear train having an odd number of gears for transmitting and reducing the speed of rotation from said input shaft to said output shaft, and means associated with said second gear train for drivingly connecting two of the gears of said second train only when said input shaft is rotated in a direction opposite said one direction to cause the output shaft to be rotated in a given direction, said first and second gear trains having different speed reduction ratios to cause one of said trains to rotate said output shaft at a greater speed and with a lesser increase in input torque than the other train, said drive motor being a polyphase electric motor wound for dual voltage operation with each motor winding having two substantially equal parts, first switching means for altering the phase relationship of said motor windings to reverse the direction of rotation of said motor, second switching means operating substantially simultaneously with said first switching means to connect said equal parts of each motor winding in parallel relationship to increase the torque delivered to said input shaft when said motor is operated in a direction to drive said output shaft at the greater speed and to connect said equal parts of each motor winding in series relationship to decrease the torque delivered to the input shaft when said motor is operated in a direction to drive the output shaft at the lesser speed.

9. A drive as defined in claim 8 further characterized by said first and second switching means comprising first relay means operable to condition said motor for operation in one direction with said two equal parts of each winding connected in parallel relationship, second relay means operable to condition said motor for operation in a reversed direction with said two equal parts of each winding connected in series relationship, a manually operated selector switch through which a selected one of said first and second relay means receives a supply of electrical energy to actuate the selected relay means, and means responsive to the accumulation of trash on said screen for supplying electrical energy to said selector switch to actuate the selected relay means.

10. A drive as defined in claim 8 further characterized by said first and second switching means comprising first relay means operable to condition said motor for operation of the motor in the direction corresponding to the lesser output shaft speed with said two equal parts of each winding connected in series relationship, second relay means operable to condition said motor for operation in the reverse direction corresponding to the higher output shaft speed with said two equal parts of each winding connected in parallel relationship, means responsive to a given difference in the heads of the water on opposite sides of said screen, due to accumulation of trash on the screen, for actuating said first relay means, and means responsive to a greater difference in the heads of the water on opposite sides of the screen for deactuating said first relay means and actuating said second relay means.

11. A drive as defined in claim 10 further characterized by timing means actuated by a reduction in the difference in the heads of the water on opposite sides of said screen from a value above said given difference to a value below said given difference for actuating one of said relay means to continue the operation of said drive motor for a predetermined time interval.

(References on following page)

References Cited in the file of this patent

UNITED STATES PATENTS

| | | |
|---|---|---|
| 1,074,125 | Lamme | Sept. 30, 1913 |
| 2,467,627 | Olson | Apr. 19, 1949 |
| 2,525,516 | Bergmann et al. | Oct. 10, 1950 |
| 2,632,876 | Willits | Mar. 24, 1953 |
| 2,679,936 | Bench | June 1, 1954 |
| 2,804,209 | Carlton | Aug. 27, 1957 |
| 2,810,305 | Brinza et al. | Oct. 22, 1957 |

FOREIGN PATENTS

| | | |
|---|---|---|
| 577,187 | Great Britain | May 8, 1946 |